United States Patent
Tai

(10) Patent No.: US 10,148,937 B2
(45) Date of Patent: Dec. 4, 2018

(54) STEREO IMAGE SCANNING DEVICE

(71) Applicant: Microtek International Inc., Hsinchu (TW)

(72) Inventor: Huei-Chuan Tai, Hsinchu (TW)

(73) Assignee: MICROTEK INTERNATIONAL INC., Hsinchu (TW)

( * ) Notice: Subject to any disclaimer, the term of this patent is extended or adjusted under 35 U.S.C. 154(b) by 73 days.

(21) Appl. No.: 15/589,055

(22) Filed: May 8, 2017

(65) Prior Publication Data

US 2018/0324400 A1  Nov. 8, 2018

(51) Int. Cl.
*H04N 13/221* (2018.01)
*H04N 13/254* (2018.01)

(52) U.S. Cl.
CPC ......... *H04N 13/221* (2018.05); *H04N 13/254* (2018.05); *H04N 2213/001* (2013.01)

(58) Field of Classification Search
CPC combination set(s) only.
See application file for complete search history.

(56) References Cited

U.S. PATENT DOCUMENTS

| | | | |
|---|---|---|---|
| 9,990,767 B1* | 6/2018 | Sheffield | H04N 13/254 |
| 2006/0055792 A1* | 3/2006 | Otsuka | G01S 3/7864 |
| | | | 348/211.4 |
| 2012/0268571 A1* | 10/2012 | Debevec | G06T 7/0073 |
| | | | 348/48 |
| 2017/0046868 A1* | 2/2017 | Chernov | H04N 13/221 |
| 2017/0200271 A1* | 7/2017 | Atria | G06T 7/11 |

* cited by examiner

*Primary Examiner* — Behrooz M Senfi
(74) *Attorney, Agent, or Firm* — Muncy, Geissler, Olds & Lowe, P.C.

(57) ABSTRACT

A stereo image scanning device includes a surround slide rail, an extending arm, at least one image capturing unit and an image processing unit. The surround slide rail is used to surround an object that is located at a geometric center of the surround slide rail. Two ends of the extending arm are connected to the surround slide rail and slid among multiple different scanning positions on the surround slide rail. The at least one image capturing unit is disposed at the extending arm, and the at least one image capturing unit is used to capture multiple images of the object at different multiple angle positions on the extending arm. The image processing unit is electrically connected to the at least one image capturing unit, and the image processing unit is used to receive and process the multiple images, so as to produce a stereo image of the object.

13 Claims, 2 Drawing Sheets

STEREO IMAGE SCANNING DEVICE

BACKGROUND OF THE INVENTION

1. Field of the Invention

The present invention relates to an image scanning device, and more particularly to a stereo image scanning device of multi-angle scan.

2. Description of the Prior Art

At the present market, most of the fixed stereo image scanning devices can only scan a surround image of a horizontal angle of view, and can not capture images of the to-be-scanned object of the upper and the lower angle of views. However, if a hand-held stereo image scanning device is used, the operator needs to slowly and evenly walk around the to-be-scanned object with the hand-held manner. In the scanning process, the moving speed of the hand-held manner may be too fast, and errors may be caused accordingly.

Thus, the most important goal for now is to provide a stereo image scanning device of multi-angle scan.

SUMMARY OF THE INVENTION

The present invention is directed to provide a stereo image scanning device, which uses an image capturing unit disposed at an extending arm to capture multiple images of an object at different multiple angle positions on the extending arm, wherein two ends of the extending arm are connected to a surround slide rail and slid among multiple different scanning positions on the surround slide rail.

A stereo image scanning device of one embodiment of the present invention includes a surround slide rail, an extending arm, at least one image capturing unit and an image processing unit. The surround slide rail is used to surround an object that is located at a geometric center of the surround slide rail. Two ends of the extending arm are connected to the surround slide rail and slid among multiple different scanning positions on the surround slide rail. The at least one image capturing unit is disposed at the extending arm, and the at least one image capturing unit is used to capture multiple images of the object at different multiple angle positions on the extending arm. The image processing unit is electrically connected to the at least one image capturing unit, and the image processing unit is used to receive and process the multiple images, so as to produce a stereo image of the object.

The objective, technologies, features and advantages of the present invention will become apparent from the following description in conjunction with the accompanying drawings wherein certain embodiments of the present invention are set forth by way of illustration and example.

DESCRIPTION OF THE PREFERRED EMBODIMENT

Various embodiments of the present invention will be described in detail below and illustrated in conjunction with the accompanying drawings. In addition to these detailed descriptions, the present invention can be widely implemented in other embodiments, and apparent alternations, modifications and equivalent changes of any mentioned embodiments are all included within the scope of the present invention and based on the scope of the Claims. In the descriptions of the specification, in order to make readers have a more complete understanding about the present invention, many specific details are provided; however, the present invention may be implemented without parts of or all the specific details. In addition, the well-known steps or elements are not described in detail, in order to avoid unnecessary limitations to the present invention. Same or similar elements in Figures will be indicated by same or similar reference numbers. It is noted that the Figures are schematic and may not represent the actual size or number of the elements. For clearness of the Figures, some details may not be fully depicted.

Figure 1:
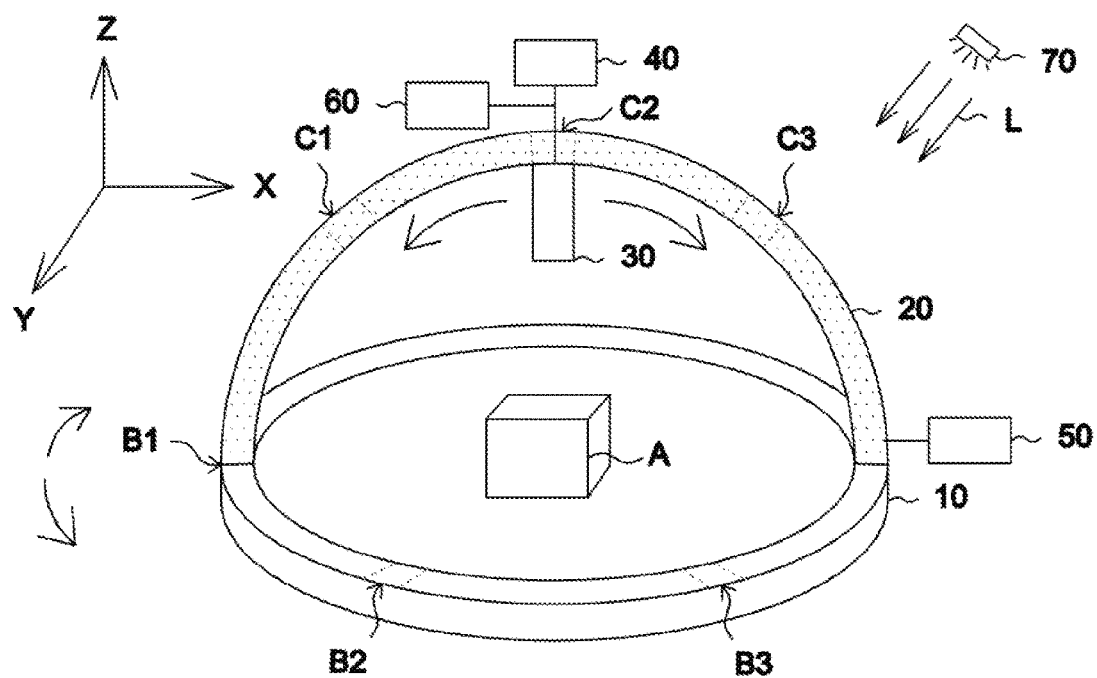
FIG. 1 is a schematic view, showing a stereo image scanning device of one embodiment of the present invention.
Figure 2:
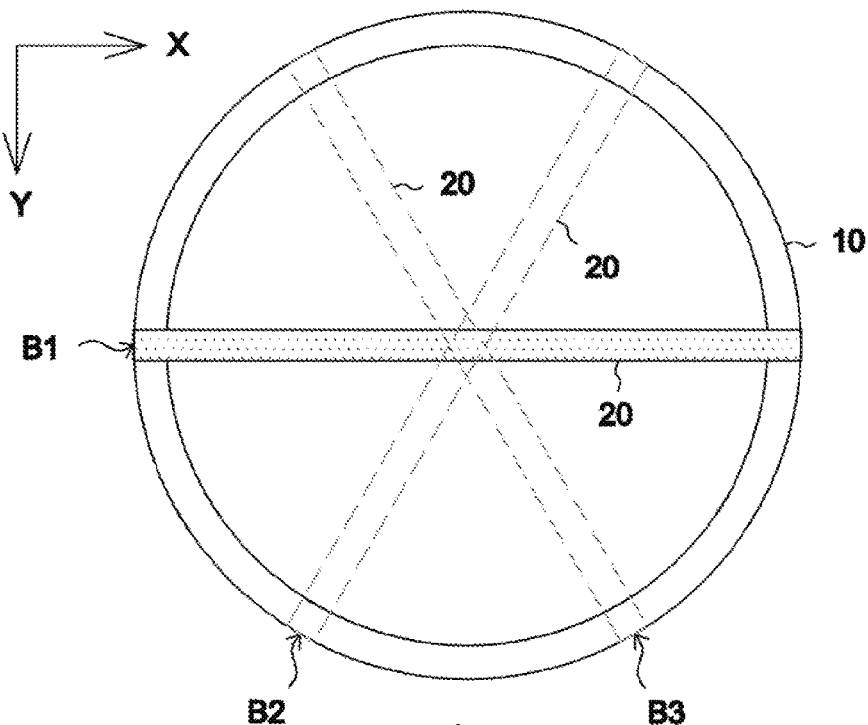
FIG. 2 is a top view, showing the stereo image scanning device of one embodiment of the present invention.

Referring to FIG. 1 and FIG. 2 together, a stereo image scanning device of one embodiment of the present invention includes a surround slide rail 10, an extending arm 20, at least one image capturing unit 30 and an image processing unit 40. The surround slide rail 10 surrounds an object A, and the object A is located at a geometric center of the surround slide rail 10. For example, the surround slide rail 10 has a shape of a circle ring, and the object A is located at a circle center of the surround slide rail 10.

Two ends of the extending arm 20 are connected to the surround slide rail 10, and the extending arm 20 is slid among multiple different scanning positions B1, B2, B3 on the surround slide rail 10. In some embodiments, the multiple scanning positions B1, B2, B3 may be different scanning positions that are spaced in a specific distance or distributed continuously, and the extending arm 20 may be slid among the multiple different scanning positions B1, B2, B3 on the surround slide rail 10 manually or automatically, which is not a limitation. For example, the stereo image scanning device further includes a surround driving unit 50 connected to the extending arm 20, and the surround driving unit 50 drives the extending arm 20 to slide along the surround slide rail 10. Preferably, the surround driving unit 50 includes a stepper motor. In one embodiment, the extending arm 20 is a semicircle ring structure. In one embodiment, a plane where the extending arm 20 is located is perpendicular to a plane where the surround slide rail 10 is located.

The at least one image capturing unit 30 is disposed at the extending arm 20, and the at least one image capturing unit 30 captures multiple images of the object A at different multiple angle positions C1, C2, C3 on the extending arm 20. In some embodiments, the multiple angle positions C1, C2, C3 may be different scanning positions that are spaced in a specific distance or distributed continuously, and the image capturing unit 30 may be slid among the different multiple angle positions C1, C2, C3 on the extending arm 20 manually or automatically, which is not a limitation. For example, the stereo image scanning device further includes a multi-angle driving unit 60 connected to the image capturing unit 30, and the multi-angle driving unit 60 drives the image capturing unit 30 to move along the extending arm 20. Preferably, the multi-angle driving unit 60 includes a stepper motor. In one embodiment, the image capturing unit 30 includes a Line-Scan light-sensing device or an Area-Scan light-sensing device. In another embodiment, the image capturing unit 30 includes a charge coupled device (CCD), a complementary metal oxide semiconductor (CMOS) or an image capturing unit of three dimensional depths, which is not a limitation.

It may be understood that the object A may reflect the light from the environment, such that the image capturing unit 30 may capture multiple images of the object A without an additional light source provided. Or, referring to FIG. 1, in one embodiment, the stereo image scanning device includes a light source 70 to provide a light L to irradiate the object A. The image capturing unit 30 may capture the irradiating light from the object A and through the optical elements (not shown), so as to produce the image of the object A. In another embodiment, the light source 70 that is connected to the multi-angle driving unit 60 through a connecting rod component may scan the object A synchronously with the image capturing unit 30, so as to obtain an image of a higher brightness and a high contrast. Those skilled in the art may modify and change, and may not be limited to this.

The image processing unit 40 is electrically connected to the at least one image capturing unit 30, and the image processing unit 40 receives and processes the multiple images to produce a stereo image of the object A. Preferably, the image processing unit 40 further includes a memory unit to store the multiple images.

Figure 3:
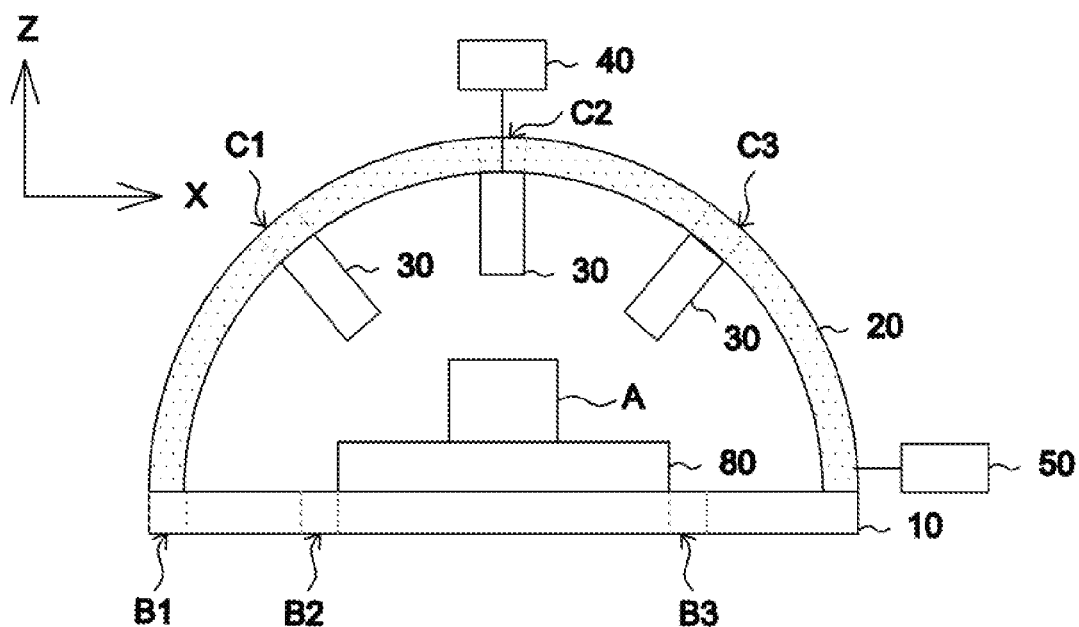
FIG. 3 is a side view, showing a stereo image scanning device of another embodiment of the present invention.

Referring to FIG. 3, in one embodiment, the image capturing unit 30 includes multiple image capturing units 30 disposed at the different multiple angle positions C1, C2, C3 on the extending arm 20. After the multiple image capturing units 30 have captured multiple images of the object A, the multiple images are delivered to the image processing unit 40, such that the image processing unit 40 may produce a stereo image of the object A. Therefore, in this embodiment, multiple images of the object A may be captured at the different multiple angle positions C1, C2, C3 on the extending arm 20 without adopting a multi-angle driving unit as well. Those skilled in the art may modify and change, and may not be limited to this.

In order to obtain the image of the bottom of the object A, continued to referring to FIG. 3, in one embodiment, the stereo image scanning device further includes a stage 80. The stage 80 carries the object A, and the stage 80 is protruded from a plane where the surround slide rail 10 is located. Preferably, the stage 80 has a transparent material. Thus, the image capturing unit 30 may move on the extending arm 20 to an angle position near the surround slide rail 10 to capture the image of the bottom of the object A, so as to realize a transmission stereo image scanning device.

To sum up the foregoing descriptions, the stereo image scanning device of the present invention uses an image capturing unit disposed at an extending arm to capture multiple images of an object at different multiple angle positions on the extending arm, wherein two ends of the extending arm are connected to a surround slide rail and slid among multiple different scanning positions on the surround slide rail. Therefore, the stereo image scanning device of the present invention may obtain images of the to-be-scanned object of different angles, such as the upper, the lower and the horizontal directions, through a stable, uniform and multi-angle scanning manner that moves around the to-be-scanned object, so that a complete and excellent stereo image may be produced.

The above embodiments are only for describing the subject matters and characteristics of the present invention, which purpose is to make those skilled in the art understand the content of the present invention and implement accordingly, and can not be used to limit the scope of the present invention. Any equivalent change or modification in accordance with the spirit disclosed in the present invention should fall within the scope of the present invention.

What is claimed is:

1. A stereo image scanning device comprising:
    a surround slide rail to surround an object that is located at a geometric center of the surround slide rail;
    an extending arm having two ends that are connected to the surround slide rail and slid among multiple different scanning positions on the surround slide rail;
    at least one image capturing unit disposed at the extending arm to capture multiple images of the object at different multiple angle positions on the extending arm; and
    an image processing unit electrically connected to the at least one image capturing unit to receive and process the multiple images, so as to produce a stereo image of the object.

2. The stereo image scanning device according to claim 1, further comprising a surround driving unit connected to the extending arm to drive the extending arm.

3. The stereo image scanning device according to claim 2, wherein the surround driving unit comprises a stepper motor.

4. The stereo image scanning device according to claim 1, further comprising a multi-angle driving unit connected to the image capturing unit to drive the image capturing unit to move along the extending arm.

5. The stereo image scanning device according to claim 4, wherein the multi-angle driving unit comprises a stepper motor.

6. The stereo image scanning device according to claim 1, wherein the image capturing unit comprises multiple image capturing units disposed at different the multiple angle positions on the extending arm.

7. The stereo image scanning device according to claim 1, wherein the surround slide rail has a shape of a circle ring.

8. The stereo image scanning device according to claim 1, further comprising a light source to provide a light to irradiate the object.

9. The stereo image scanning device according to claim 1, further comprising a stage to carry the object, wherein the stage is protruded from a plane where the surround slide rail is located.

10. The stereo image scanning device according to claim 9, wherein the stage has a transparent material.

11. The stereo image scanning device according to claim 1, wherein a plane where the extending arm is located is perpendicular to a plane where the surround slide rail is located.

12. The stereo image scanning device according to claim 1, wherein the image processing unit further comprises a memory unit to store the multiple images.

13. The stereo image scanning device according to claim 1, wherein the image capturing unit comprises a charge coupled device or a complementary metal oxide semiconductor.

\* \* \* \* \*